United States Patent [19]

Schriner

[11] Patent Number: 4,863,140
[45] Date of Patent: Sep. 5, 1989

[54] LOAD-BEARING UNIT FOR USE IN SETS

[75] Inventor: Michael J. Schriner, Rocky River, Ohio

[73] Assignee: Microvision, Inc., Westlake, Ohio

[21] Appl. No.: 232,473

[22] Filed: Aug. 15, 1988

[51] Int. Cl.$^4$ ............................................. F16M 13/00
[52] U.S. Cl. ................... 248/639; 108/143; 248/235; 248/424; 248/670; 248/675; 248/676; 248/918; 400/682
[58] Field of Search .................. 248/1 B, 1 A, 1, 235, 248/359 E, 677, 676, 639, 670, 298, 674, 675, 424, 432, 646, 658, 346, 201; 108/69, 90, 143; 312/208, 196; 400/682, 691

[56] References Cited

U.S. PATENT DOCUMENTS

| | | |
|---|---|---|
| D. 286,715 | 11/1986 | Schriner . |
| D. 290,850 | 7/1987 | Yon et al. . |
| 2,664,258 | 12/1953 | Lanier . |
| 2,698,152 | 12/1954 | Kaye . |
| 3,732,965 | 5/1973 | Mero ................... 400/682 |
| 3,844,395 | 10/1974 | Mero et al. ............ 400/682 X |
| 4,483,572 | 11/1984 | Story . |
| 4,512,174 | 4/1985 | Rhoades ............... 248/646 X |
| 4,540,146 | 9/1985 | Basile .................. 248/201 |
| 4,624,510 | 11/1986 | Jedziniak . |
| 4,703,919 | 11/1987 | Drake et al. ........... 248/677 |
| 4,709,972 | 12/1987 | Labudde et al. . |
| 4,717,112 | 1/1988 | Pirkle ................... 248/639 |
| 4,755,010 | 7/1988 | Wilson et al. .......... 248/1 B X |

FOREIGN PATENT DOCUMENTS

| | | |
|---|---|---|
| 2539441 | 3/1977 | Fed. Rep. of Germany . |
| 1315836 | 12/1961 | France ................... 248/424 |

OTHER PUBLICATIONS

Inmac Catalog, 42nd B Ed. Feb. 1984, pp. 5 & 8, published by Inmac Corp.
Devoke Data Products Catalog, Fall–Winter, 1984, p. 18.
Global Computer Supplies Catalog, 1986, p. 9, published by Global Equipment Co., Plainview, N.Y.
P.C. Magazine, vol. 6, No. 5, 3/10/87, back cover adv. of Curtis Mfg. Co., Inc.

Primary Examiner—Alvin C. Chin-Shue
Assistant Examiner—David L. Talbott
Attorney, Agent, or Firm—Watts, Hoffmann, Fisher & Heinke Co.

[57] ABSTRACT

This invention relates to an elongated support unit for use in cooperating sets such as matched pairs. The unit has a frame having one or more substantially horizontal stages, one above the other, below its top. Each stage is equipped with a movable platform that can be drawn forward and retracted. The platform is disposed to share a load with at least one corresponding platform of another unit of the set. A set of the units can be adapted particularly well to carrying a CRT, computer, and/or printer across their tops and a keyboard borne on cooperating movable platforms therebelow.

12 Claims, 5 Drawing Sheets

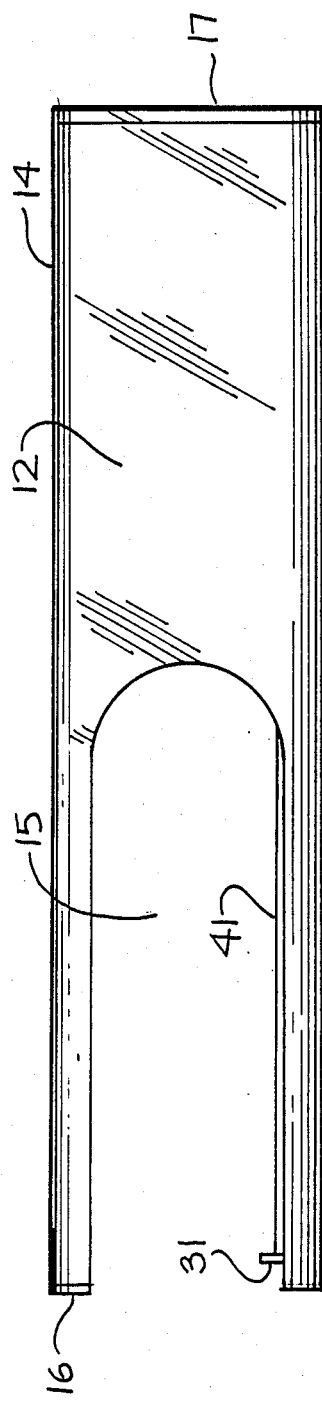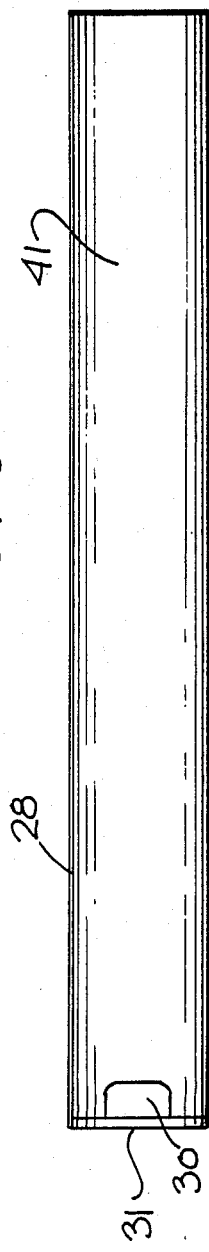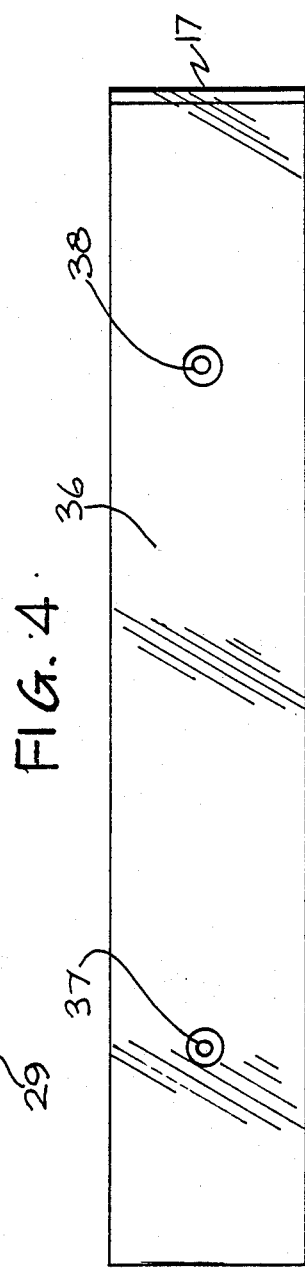

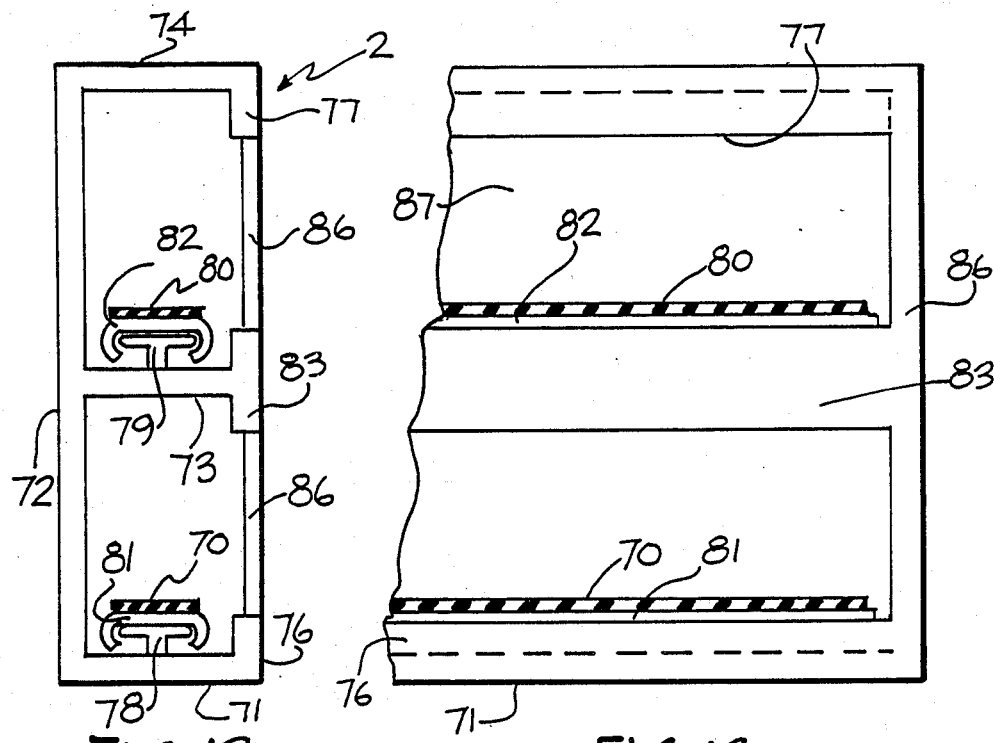
FIG.12  FIG.13
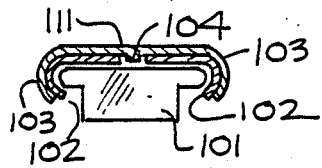
FIG.14
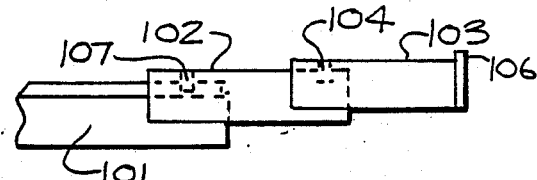
FIG.15
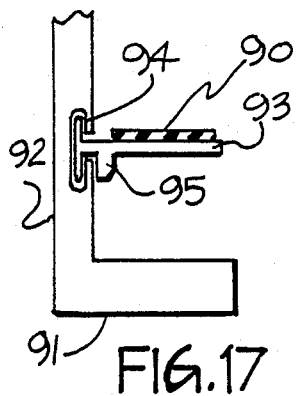
FIG.17
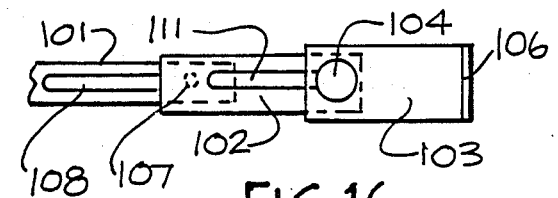
FIG.16
FIG.18

1

LOAD-BEARING UNIT FOR USE IN SETS

BACKGROUND OF THE INVENTION

This invention relates to a unit for use in sets such as pairs in lieu of a load-bearing support for a rigid top load with one or more load-bearing platforms or drawers therebelow that can be pulled out and pushed in.

There appears to be nothing quite like it in the furniture art, and especially in the abundant art of stowaway keyboard drawers, frames or tables for computer or cathode ray tube screen devices for which this instant invention is expected to have much application. There are, of course, many desk-like and table-like articles and possibly even frames for holding a rigid load (like a CRT screen device) wherein the top and/or bottom connects two sides fixedly and, underneath the top, is a slide-out drawer, a platform, or a pair of integral slideways to support a lower load such as a keyboard and allow it to be drawn out and pushed in.

Dresser and bureau drawers and telephone list cards slidable from under hotel and motel telephones are perhaps even more familiar articles of at least analogous if not exactly like operation. However, the elements of all such furniture are in some way interconnected into one structure rather than constituting a set of laterally movable, independent, cooperating structures that utilize the rigid top load itself to join them into a useful and versatile support system.

Perhaps the nearest prior art is: a pair of driveup automobile supports used by mechanics to raise two wheels of a car for working thereunder; or the present inventor's printer stand units represented by U.S. Pat. No. Des. 286,715. However, these devices have no element that is adapted to permit the sliding of some load in and out below the automobile or below the printer.

Clearly, the present invention can be used for a rigid top load, e.g. a boxy object such as a CRT device etc. of various length with at least one movable load below it for convenient use and practical space-conserving storage. If a rigid deck or drawer is placed between a pair of the sliding platform elements on one stage, the lower load or loads do not have to be rigid.

Furthermore, a pair of units of the present invention can be toed-in or toed-out a bit to restrict or impede the glide-out movement of the movable load. Other advantages over prior related devices include portability, facilitated and compact storage, and a special economy by dint of requiring no built-in integral joining element on the top and/or the bottom of an interacting pair of the units i.e. a joining element such as a table top, a table base, and/or a frame for or in lieu of either a top or a base.

BROAD STATEMENT OF THE INVENTION

The instant unit is for use in cooperating sets to accommodate a rigid top load while also movably accommodating a lower load, the unit comprising: a frame having at least one elongated stage and a top disposed above the highest stage, the top being capable of supporting part of the load thereover; and a lower load-bearing platform mounted to move inwardly and outwardly with respect to the stage.

BRIEF DESCRIPTION OF THE DRAWINGS

The clearances of most of the moving parts are exaggerated for simplicity of depiction.

FIG. 3 is a right side elevation view of the unit of FIG. 1;

FIG. 4 is a plan view of the glidable platform of the unit of FIG. 1;

FIG. 5 is a plan view of the upper side of the only stage of the unit of FIG. 1, which stage acts as the base of the unit;

FIGS. 8 through 18 are schematic to stress some variations of the invention. FIG. 8 is a fragmentary top plan view of a single stage unit wherein the platform is mounted to roll in and out;

FIG. 9 is a front elevation view of the unit of FIG. 8;

FIG. 10 is a fragmentary right side elevation of the unit of FIG. 8;

FIG. 11 is a back elevation view the unit of FIG. 8;

FIG. 12 is a front elevation view of a two-stage unit;

FIG. 13 is a fragmentary right side elevation view of the unit of FIG. 12;

FIG. 14 is cross sectional elevation view of a load-bearing platform that can be telescoped outwardly for extension and inwardly for retraction as the rigid load thereon is pulled out and pushed in;

FIG. 15 is a fragmentary view of the top of the platform of FIG. 14 extended;

FIG. 16 is a fragmentary view of the side elevation of FIG. 14 extended; and

FIGS. 17 and 18 are fragmentary cross sections of frames showing alternative ways of mounting the movable platforms or supports therefor.

BEST MODES FOR CARRYING OUT THE INVENTION

Figure 1:
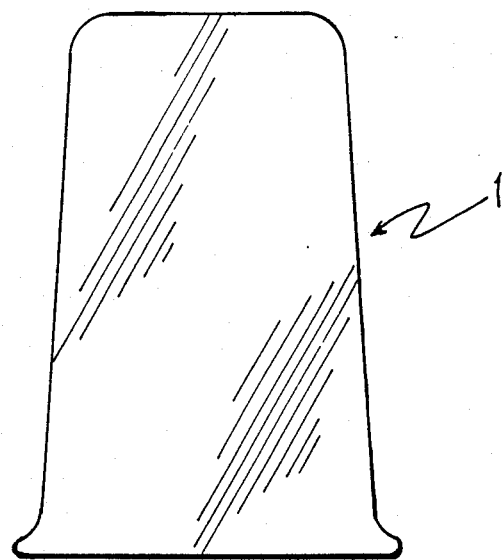
FIG. 1 is a rear elevation view of a preferred single stage unit.

In FIG. 1, arrow 1 refers broadly to the rear of a preferred single stage unit. The perspective view of FIG. 2 is a front view.

Figure 2:
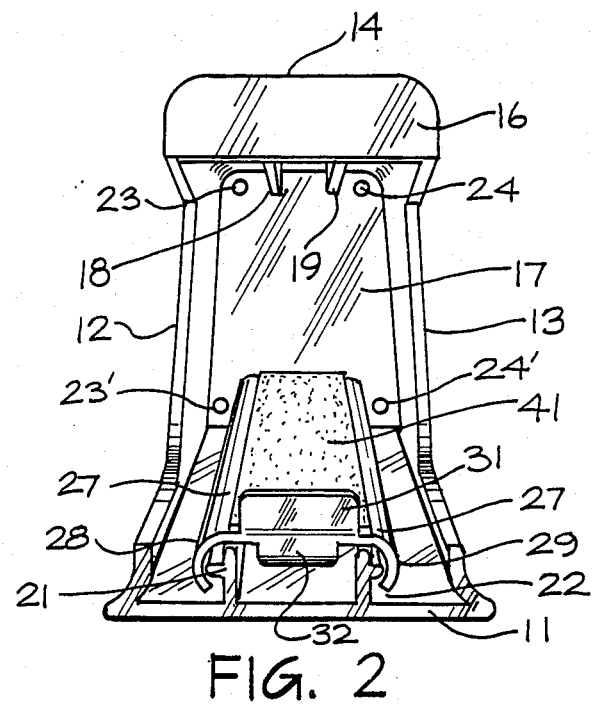
FIG. 2 is front perspective view of the unit of FIG. 1.

In FIG. 2 the frame of the unit has a stage 11 as a base, a cutout left sidewall 12, a cutout right sidewall 13, a top 14, an upper shield 16, a rear wall 17, upper stiffening ribs 18 and 19, sprues 23, 23', and 24, 24', a left rail 21, and a right rail 22. Each rail is, in effect, a runner extending to the rear with a stabilizing ridge or flange protruding from its outer side and extending to the rear substantially parallel to the top of the rail. The rails 21 and 22 constitute the track of this unit. The track here has multiple rails. It also could have just a single rail.

The lower load-bearing platform 27 is rounded on each side, to form retainers 28 and 29 to hold the platform slidably under the right and left stabilizing ridges of the rails. Platform 27 has a flat top. The platform is slidable back and forth on the track. The sliding is aided by a strip of slick plastic adhesively mounted under the platform and visible only in FIG. 6. The deck of platform 27 is coated with a frictional deck surface 41 such as a rubber strip or a cured paint-like composition adherent to that deck. At the front of the platform is lip 31, rising to help retain a lower load, and a front skirt 32 for finger pressure to slide the platform out and in, respectively.

Except for the snapped-in upper shield 16 and the glued-in rearwall 17, both molded from synthetic resin, the frame, including the rails, is all of aluminum. The base of stage 11 is 6.4 cm. wide and 39 cm. long. The frame is 8.9 cm. high overall, and its top is 4.6 cm. wide overall.

The platform 27 is of galvanized steel. It is 30.2cm. long, has overall width of 3.4 cm., and the flat rubber strip on its deck surface 41 is 2.2 cm. wide. The front of the fully retracted platform is 0.8 cm. in from the front of the frame; extended, it projects out 21 cm. from that point.

FIG. 3 shows the right side wall 12 of the FIG. 1 unit with its cutout forward portion 15, top 14, upper shield 16, rear wall 17 of the frame, lip 31, and frictional deck surface 41.

FIG. 4 shows the right and left retainers 28 and 29, the lip 31, a front gap 30 in the deck from whence the front skirt was pressed out and down, and the frictional deck surface 41 of the platform 27. There is a rear skirt, not shown, that projects downwardly from the deck near the back end thereof.

FIG. 5 shows upper surface 36 of stage 11 with a forward lug 37 and a rear lug 38; these lugs project upward. When platform 27 is pushed back so that its front is slightly inboard of the front of the frame, the rear skirt 34 strikes lug 38 and the platform 27 is arrested from further rearward movement. When platform 27 is pulled forward, the rear skirt 34 contacts front lug 37, and the platform then is arrested from further forward movement.

Figure 6:
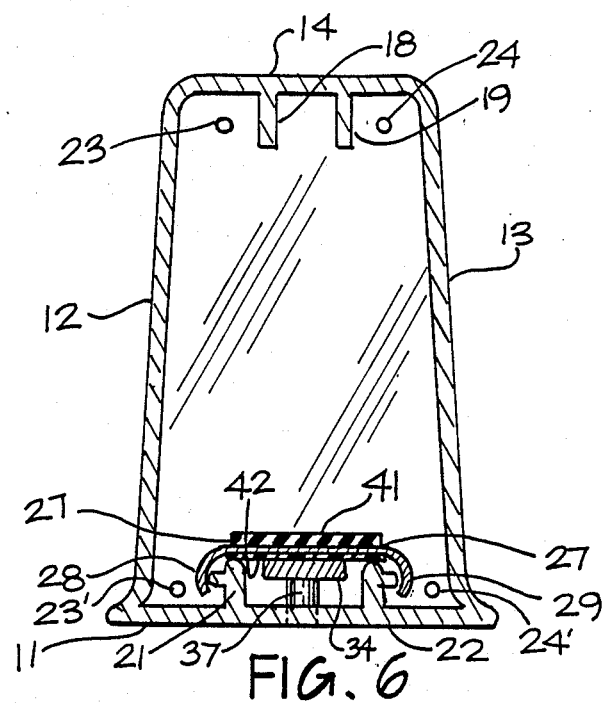
FIG. 6 is a cross sectional elevation of the unit of FIG. 1 near the rear.

Evident in FIG. 6 are: the frame including its stage 11, sidewalls 12 and 13, top 11, ribs 18 and 19, sprues 23, 23', 24, and 24', and rails 21 and 22; and the load-bearing slidable platform 27, platform retainers 28 and 29, and rubber strip 41 adhering to the top of the deck of platform 27. Rear skirt 34 is seen in front of the rear stop 37.

Figure 7:
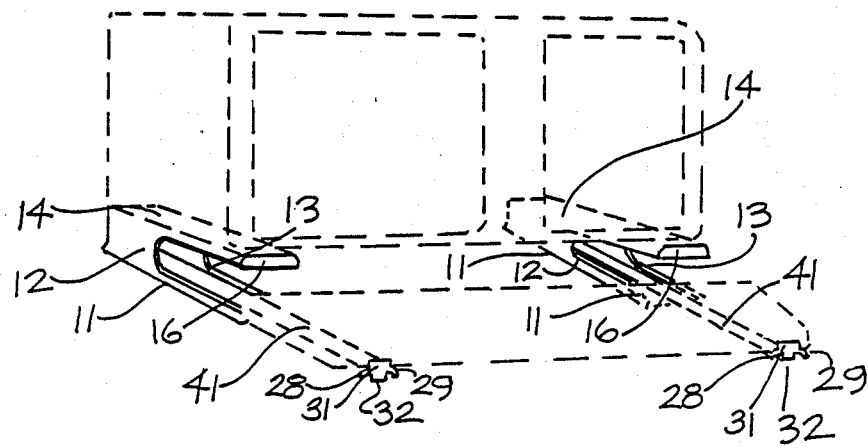
FIG. 7 is a perspective view of a pair of the units of FIG. 1 arranged to show how they can support across their tops a box-like computer with a CRT screen while having the keyboard therefor pulled outward on the lower platform from under the box and toward the user. The thus-supported loads and the covered parts of the frames and the extended platforms are depicted in dashes rather than solid lines.

In FIG. 7 a pair of like units of the preceding FIGS. 1-6 are lined up to be essentially in parallel, both being orthogonal with respect to and reaching to the front of the box-like computer sitting on the tops 14 of their respective frames. The frame elements, namely stages 11, side walls 12 and 13, tops 14, and upper shields 16, are depicted with solid lines where visible and with dashes where hidden by loads.

The platforms in FIG. 7 are fully extended. The platform elements' frictional surfaces 41, retainers 28 and 29, lips 31, and front skirts 32 are depicted with lines like those of the frame elements. On the extended platform there is indicated in dashes a long flat object with the long edges rounded; it represents a keyboard for the computer in a usable position.

Figure 9:
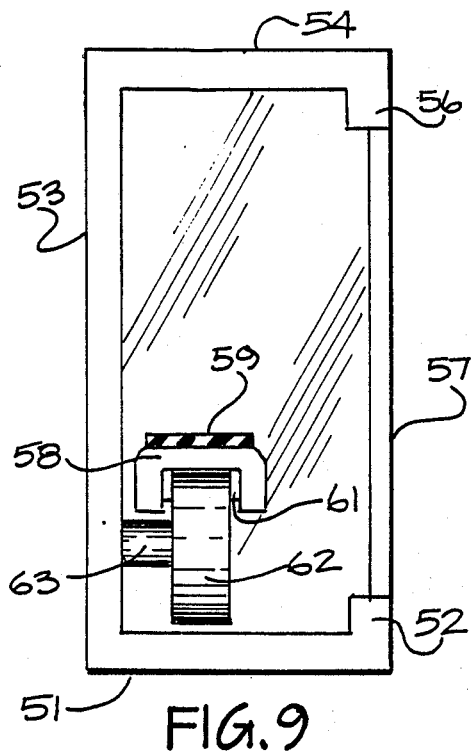
Figure 8:
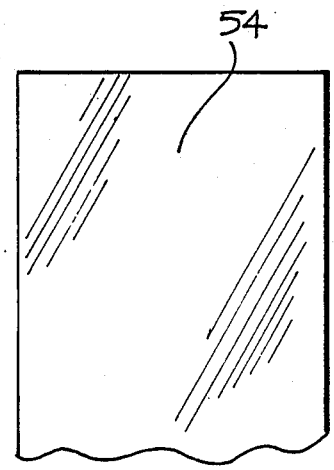

FIG. 8 shows the top view of a unit, indicated broadly by arrow 2, this unit having a movable platform 58 that rolls in and out. The front view of this unit, FIG. 9, shows the frame made of stage 51, left side 53, top 54, stage stiffener 52, top stiffener 56 and the right edge of the back wall stiffener 57.

Projecting inwardly from the sidewall 53 is axle 63 upon which a front roller wheel 62 rotates freely. This and a like rear wheel support the platform 58; the platform has a non-skid deck layer 59, a guide extending downwardly from each long edge, and a rear stop 61.

Figure 10:
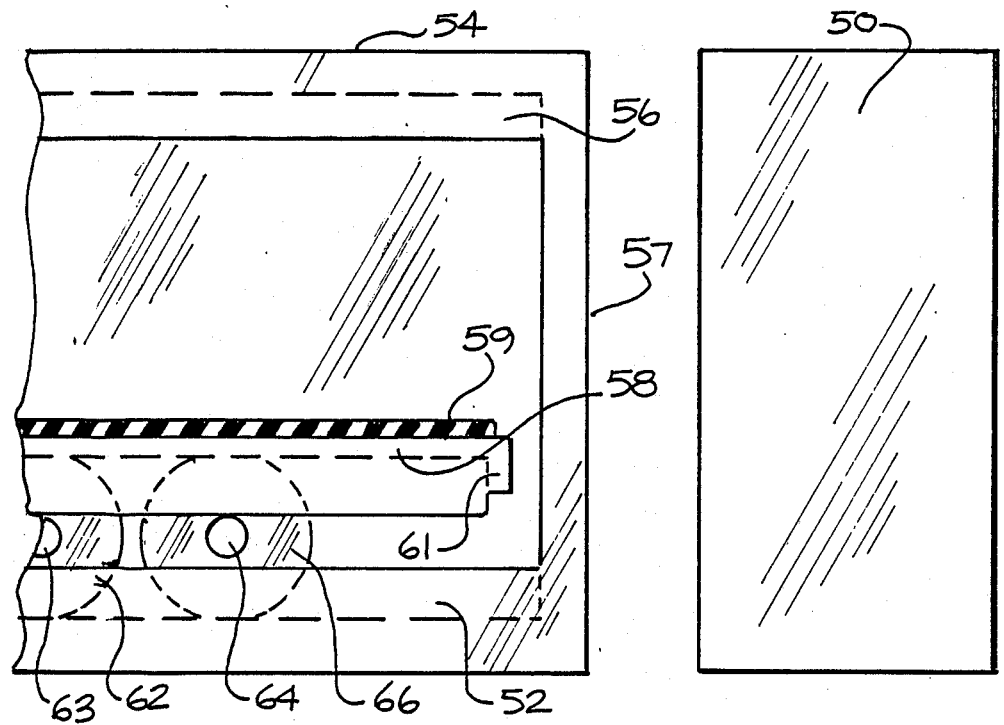
Figure 11:
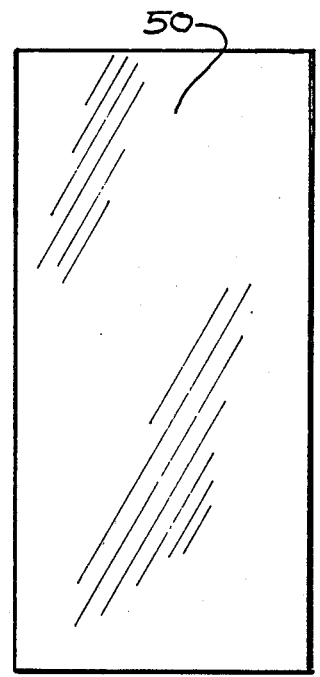

FIG. 10 is a side elevation view of this unit. Rear roller wheel 64 rotates on rear axle 66, the axle projecting from sidewall 53. The top of the platform 58, with its non-skid deck 57, and rear stop 61 also are seen, as well as are front wheel 62, axle 63, stage stiffener 52, top stiffener 56, top 54, and back wall stiffener 57. FIG. 11 shows the back wall 50 of the unit of FIG. 9.

The platform elements can be mounted to slide and/or roll in and out in various other conventional ways such as are used for furniture drawers, desk tops, trays, breadboards etc. Thus, ball, roller, and needle bearing devices, and polytetrafluoroethylene, polyolefin, and/or nylon slides, guideways, and/or rollers can be used for glideably supporting the movable platform elements of the invention and making them quiet. The rolling elements or slides can be attached to the platforms, to the frames, or to the tracks of the frames.

Normally the movable platform elements are made to hold and move their loads in a level manner, but some tilt can be built in if desired, provided that means to hold the load and platform at a particular point of travel is included unless, of course, automatic extension of or retraction of the platform and its load are desired. The tops of the frames usually are horizontal; they can be sloped, if desired; often the load on them is propped up slightly at the front, e.g. with small rubbery props at the front ends of the tops.

Arrow 2 indicates broadly the two-stage unit of FIG. 12. This front elevation view of the unit depicts the stages 71 and 73, a top 77, a left sidewall 72, an upper track 79, a lower track 78, sliding platforms 82 and 81 thereon with their non-skid deckings 70 and 80, respectively, the stiffener 86 of the rear wall and stiffening members 76, 83, and 77 for the first and second stages and the top, respectively. The matched opposing outside frame in a pair of these units necessarily would be essentially a mirror image of the one shown in FIG. 12. This is because the FIG. 12 unit has no cut-out in its only side wall 72 that would permit any movable load to span from one platform to such cooperating platform at essentially the same level in a companion unit were the companion unit to be an exact duplicate of the FIG. 12 unit.

The right side elevation view of this multistory unit, FIG. 13, shows stiffening member 76 of stage 71, stiffening member 83 of stage 73, stiffening member 77 of top 74, stiffening member 86 of the rear wall, the side wall 72, and the deckings 70 and 80 of sliding platforms 81 and 82. Means such as grips or handles for sliding the platforms in and out are not shown. They can be provided conventionally if needed or desired. Travel limit stops, not shown, for the platforms also can be provided.

The term "glidable" with respect to a platform is used herein in the sense of being easily moved or slid back and forth in essentially the horizontal plane on sliding and/or rolling elements.

In FIG. 14 the cross section of track 101, a slotted under platform part 102, a telescoping upper platform part 103 and a stop 104 for the upper platform part are seen. FIG. 15 shows in side elevation the platform telescopically extended wherein the upper part 103 with lip 106 rides out over the under part 102 and pulls out the part 102 with the stop 104. Also shown in dashes is hidden lower platform part stop 107. FIG. 16 shows the thus-extended platform in plan. Hidden lower platform part stop 107 is restricted in its travel by slot 108 in the track 101 the and stop 104 by the slot 111 in the lower platform part 102.

While tracks can be desirable for gliding or rolling the platforms, guideways in the wall or stage (or both) can be used for moving platform elements back and forth. This is especially true where the movable load is light and not apt to cause binding of its sliding element or elements in an appropriately fitted keyway, groove or guideway.

Thus, FIG. 17 shows the left side wall 92 of a frame having stage 91 therebelow and a keyway 94 formed therein that extends horizontally to the rear. Slidably mounted into the keyway 94 is the left end of platform 93; that end is formed to fit the keyway slidably and have support from lug 95. The lug can be fitted with a wheel or roller (not shown) that bears against the inside of sidewall 92 for facilitating moving of the platform 93.

FIG. 18 shows stage 96 and left sidewall 97 of a frame. The stage has keyway 99 in it. The platform 98 fits into it slidably and is thus supported. In place of the keyways of FIGS. 17 and 18 there can be used a flanged rail, projecting inwardly in FIG. 17 or upwardly in FIG. 18, and the platform elements can grip the rail flanges slidably.

There is nothing to prevent a user of these units from affixing them to a floor or wall or deck once their alignment has been selected. Usually with the "one story" (one stage) units this is not done. A unit can be made quite stable for free-standing, e.g. with a widened base on the lowest stage or with little overall broadness, e.g. a stage up to 15 cm. wide. However, additional fastening or structural bracing might be desirable, e.g. for tall, multistory units.

Modifications and variations of the invention will be apparent to those skilled in the art in the light of the foregoing detailed disclosure and drawings. Therefore, it is to be understood that, within the scope of the appended claims, the invention can be practiced otherwise than as shown and described.

I claim:

1. An elongated unit for stably sharing a load as one part of a cooperating set of companion units, said elongated unit comprising:

a frame; and
   a movable platform,
   the frame including a substantially horizontal stage, a substantially horizontal load-supporting top thereabove, a track between said stage and said top, and an open front,
   said track, stage, and top being in a substantially parallel relationship,
   the movable platform being mounted on the track for sharing at least a fraction of the weight of a load with a corresponding movable platform of a companion unit,
   the movable platform being movable outwardly from a position under the top between said stage and said top and retractable back thereto,
   at least one side of the frame having an open area to allow a load that is partly borne by the movable platform to project beyond said at least one side and to move without impedance out of or into said open area in said at least one side as the platform is moved outwardly from a position under the top or is retracted back into a position thereunder.

2. The unit of claim 1 wherein the set is a pair.

3. The unit of claim 1 wherein there is a single movable platform.

4. The unit of claim 3 wherein the movable platform is slidably mounted.

5. The unit of claim 3 wherein the movable platform is movable on rotatable bearings.

6. The unit of claim 3 wherein the movable platform can be telescoped outwardly for extension.

7. The unit of claim 3 wherein both sides of the frame have said open area.

8. The unit of claim 1 wherein there are a plurality of movable platforms, one disposed above another.

9. The unit of claim 8 wherein at least one of the movable platforms is slidably mounted.

10. The unit of claim 8 wherein at least one of the movable platforms is movable on rotatable bearings.

11. The unit of claim 8 wherein at least one of the movable platforms can be telescoped outwardly for extension.

12. The unit of claim 8 wherein both sides of the frame have said open area.

* * * * *